(12) United States Patent
Hosokawa et al.

(10) Patent No.: US 8,337,572 B2
(45) Date of Patent: Dec. 25, 2012

(54) BATTERY AND METHOD FOR PRODUCING THE SAME

(75) Inventors: Takashi Hosokawa, Osaka (JP); Yukihiro Okada, Osaka (JP); Kiyomi Kozuki, Osaka (JP); Hideaki Fujita, Kyoto (JP)

(73) Assignee: Panasonic Corporation, Osaka (JP)

( * ) Notice: Subject to any disclaimer, the term of this patent is extended or adjusted under 35 U.S.C. 154(b) by 372 days.

(21) Appl. No.: 12/739,820

(22) PCT Filed: May 8, 2009

(86) PCT No.: PCT/JP2009/002028
§ 371 (c)(1),
(2), (4) Date: Apr. 26, 2010

(87) PCT Pub. No.: WO2009/153914
PCT Pub. Date: Dec. 23, 2009

(65) Prior Publication Data
US 2010/0247991 A1  Sep. 30, 2010

(30) Foreign Application Priority Data
Jun. 17, 2008 (JP) ................................. 2008-158383

(51) Int. Cl.
*H01M 10/04* (2006.01)
*H01M 2/26* (2006.01)

(52) U.S. Cl. .................. 29/623.1; 29/623.5; 429/94

(58) Field of Classification Search .............. 429/94; 29/623.1, 623.5
See application file for complete search history.

(56) References Cited

U.S. PATENT DOCUMENTS
2003/0118902 A1* 6/2003 Schubert et al. .............. 429/174
2006/0204841 A1 9/2006 Satoh et al.
2007/0190404 A1 8/2007 Hatanaka et al.
2007/0196730 A1* 8/2007 Kozuki ..................... 429/161

FOREIGN PATENT DOCUMENTS

| JP | 1-92073 | 6/1989 |
| JP | 07-263029 | 10/1995 |
| JP | 11-245042 | 9/1999 |
| JP | 2002-042769 | 2/2002 |
| JP | 2003-036834 | 2/2003 |
| JP | 2005108454 A * | 4/2005 |
| JP | 2006-252890 | 9/2006 |
| JP | 2008103309 A * | 5/2008 |

\* cited by examiner

*Primary Examiner* — Gregg Cantelmo
(74) *Attorney, Agent, or Firm* — McDermott Will & Emery LLP

(57) ABSTRACT

It is possible to ensure welding of an exposed portion of an electrode core member protruding from one end surface of an electrode group to a desired connection portion of a current collector plate by constituting a battery wherein an end portion of a first electrode is protruding from an end portion of a second electrode and an end portion of a separator on one end surface of an electrode group, the protruding end portion of the first electrode includes an exposed portion of a first electrode core member, the exposed portion of the first electrode core member is welded to a connection portion on one surface of the first current collector plate, and an insulating layer is formed in an area except for a reverse face portion of the connection portion on the other surface of the first current collector plate.

11 Claims, 5 Drawing Sheets

BATTERY AND METHOD FOR PRODUCING THE SAME

RELATED APPLICATIONS

This application is the U.S. National Phase under 35 U.S.C. §371 of International Application No. PCT/JP2009/002028, filed on May 8, 2009, which in turn claims the benefit of Japanese Application No. 2008-158383, filed on Jun. 17, 2008, the disclosures of which Applications are incorporated by reference herein.

TECHNICAL FIELD

The present invention relates to a battery which is suitable as a power source for driving a variety of apparatus, and particularly relates to a battery having a current collecting structure that exhibits low resistance and is appropriate for discharging at a large current, and a method for producing the battery.

BACKGROUND ART

Secondary batteries such as non-aqueous electrolyte secondary batteries, nickel-metal hydride secondary batteries, and nickel-cadmium secondary batteries are used as a power source for driving a variety of apparatus. Secondary batteries have various uses from consumer apparatus exemplified by cellular phones to electric vehicles, electric tools and the like. Above all, non-aqueous electrolyte secondary batteries attract a great attention because they are small-sized, light-weight, and have a high energy density. In recent years, development of the secondary batteries having a higher energy density and a higher output has been increased.

A secondary battery used for consumer apparatus, for example a non-aqueous electrolyte secondary battery includes in general a metallic battery case having a bottom for housing an electrode group and an electrolyte, and a sealing plate for sealing an opening of the battery case. The sealing plate includes a metallic filter serving as an internal terminal and a metallic cap serving as an external terminal, and a safety valve and a PTC element are usually interposed between these. The safety valve is composed of a metal thin film and an explosion-proof valve, for example. The sealing plate is formed by caulking the periphery of the metallic filter on the periphery of the metallic cap, the PTC element, and the safety valve with an inner gasket made of resin interposed therebetween.

The metal thin film and the explosion-proof valve constituting the safety valve are welded at respective central portions and are electrically connected. In the case where a battery is erroneously overcharged and an internal pressure of the battery is abnormally increased, the metal thin film breaks to block the current path. At this time, gas inside the battery is discharged outside. For high output purposes requiring discharging at a large current, it is necessary to secure such a safety function and generate a large current efficiently by inhibiting change in internal resistance associated with change over time and change of temperature.

As a technique for efficiently generating a large current in a large-sized lithium ion secondary battery, PTL 1 proposes to form a current collector portion by sandwiching a tap portion (end portion) of a metal material (core member) constituting an electrode by a conductive member and welding the end portion to the conductive member.

On the other hand, PTL 2 proposes a battery in which an end portion of an electrode core member is made to protrude from an electrode group and the protruding portion is connected to a current collector plate. The current collector plate has a cutaway groove portion, and the current collector plate and a tip of the protruding portion are connected to each other on the periphery of the groove portion. According to this proposition, it seems that the connection area of the current collector plate with the protruding portion can be set smaller and the strength of the connection portion can be increased.

[Citation List]
[Patent Literature]
[PTL 1] Japanese Laid-Open Patent Publication No. 7-263029
[PTL 2] Japanese Laid-Open Patent Publication No. 2003-36834

SUMMARY OF INVENTION

Technical Problem

PTLs 1 and 2 indicate an arc welding method, a laser welding method, and an electron beam method as a means for welding an electrode group to a current collector member (conductive member or current collector plate). During welding, however, tools for fixing the current collector member may possibly be displaced from a prescribed location, and an energy source such as an arc may not fly to an intended direction. In such a case, an electrode core member and a current collector member are welded together at a point away from an intended welding portion.

Also, when an arc is scattered or diffuse-reflected, heat energy may pierce a current collector plate thereby damaging an electrode core member under the current collector plate. As a consequence, the reliability of the welding portion of electrode group to the current collector plate is lowered. It is not easy to control the energy strength of the arc and to prevent scattering or diffusion-reflection of the arc.

For the aforementioned reason, mass-production of batteries by the methods of PTLs 1 and 2 would result in a decrease in the production yield.

Solution to Problem

The present invention has an object to ensure welding of the current collector plate to the electrode plate at an intended connection portion.

The present invention relates to a battery comprising: an electrode group comprising a first electrode, a second electrode, and a separator interposed therebetween that are wound or laminated; and a first current collector plate electrically connected to the first electrode, wherein the first electrode includes a first electrode core member and a first electrode material mixture layer formed on the first electrode core member; the second electrode includes a second electrode core member and a second electrode material mixture layer formed on the second electrode core member; one end portion of the first electrode is protruding from an end portion of the second electrode and an end portion of the separator at one end surface of the electrode group, and the protruding end portion of the first electrode has an exposed portion of the first electrode core member; the exposed portion of the first electrode core member is welded to a connection portion on one surface of the first current collector plate; and an insulating layer is formed in an area except for a reverse face portion of the connection portion on the other surface of the first current collector plate.

Also, the present invention relates to a battery comprising: an electrode group comprising a first electrode, a second electrode, and a separator interposed therebetween that are wound or laminated; and a first current collector plate electrically connected to the first electrode and a second current collector plate electrically connected to the second electrode, wherein the first electrode includes a first electrode core member and a first electrode material mixture layer formed on the first electrode core member; the second electrode includes a second electrode core member and a second electrode material mixture layer formed on the second electrode core member; one end portion of the first electrode is protruding from an end portion of the second electrode and an end portion of the separator at one end surface of the electrode group; the protruding end portion of the first electrode has an exposed portion of the first electrode core member; the protruding end portion of the first electrode has an exposed portion of the first electrode core member; one end portion of the second electrode is protruding from an end portion of the first electrode and an end portion of the separator at the other end surface of the electrode group; the protruding end portion of the second electrode has an exposed portion of the second electrode core member; the exposed portion of the first electrode core member is welded to a connection portion (first connection portion) on one surface of the first current collector plate; an insulating layer is formed in an area except for a reverse face portion of the first connection portion on the other surface of the first current collector plate; the exposed portion of the second electrode core member is welded to a connection portion (second connection portion) on one surface of the second current collector plate; and an insulating layer is formed in an area except for a reverse face portion of the second connection portion on the other surface of the second current collector plate.

The present invention relates to a method for producing a battery including the steps of:

(i) forming a first electrode material mixture layer on a first electrode core member to obtain a first electrode having an exposed portion of the first electrode core member on one end portion thereof;

(ii) forming a second electrode material mixture layer on a second electrode core member to obtain a second electrode;

(iii) winding or laminating the first electrode and the second electrode with a separator interposed therebetween to constitute an electrode group at one end surface of which the exposed portion of the first electrode core member is protruding from an end portion of the second electrode and an end portion of the separator;

(iv) preparing a first current collector plate including an intended connection portion on one surface thereof and an insulating layer formed in an area except for a reverse face portion of the intended connection portion on the other surface thereof; and (v) welding the exposed portion of the first electrode core member to the intended connection portion of the first current collector plate by applying an arc from the above other surface of the first current collector plate.

Also, the present invention relates to a method for producing a battery including the steps of:

(i) forming a first electrode material mixture layer on a first electrode core member to obtain a first electrode having an exposed portion of the first electrode core member on one end portion thereof;

(ii) forming a second electrode material mixture layer on a second electrode core member to obtain a second electrode having an exposed portion of the second electrode core member on one end portion thereof;

(iii) winding or laminating the first electrode and the second electrode with a separator interposed therebetween to constitute an electrode group at one end surface of which the exposed portion of the first electrode core member is protruding from an end portion of the second electrode and an end portion of the separator, and at the other end surface of which the exposed portion of the second electrode core member is protruding from an end portion of the first electrode and the end portion of the separator;

(iv) preparing a first current collector plate including an intended connection portion (first intended connection portion) on one surface thereof and an insulating layer formed in an area except for a reverse face portion of the first intended connection portion on the other surface thereof, and a second current collector plate including an intended connection portion (second intended connection portion) on one surface thereof and an insulating layer formed in an area except for a reverse face portion of the second intended connection portion on the other surface thereof;

(v) welding the exposed portion of the first electrode core member to the first intended connection portion of the first current collector plate by applying an arc from the above other surface of the first current collector, and welding the exposed portion of the second electrode core member to the second intended connection portion of the second current collector plate by applying an arc from the above other surface of the second current collector plate.

In the configuration described above, an insulating layer may also be formed on a part of the reverse face portion of the connection portion (intended connection portion). Further, a certain effect can be obtained if an insulating layer is formed on at least a part of the area except for the reverse face portion of the connection portion (intended connection portion).

It is preferable that an insulating layer is also formed on a peripheral side surface of the current collector plate. The insulating layer on the peripheral side surface not only prevents scattering of the arc but also serves to prevent electrical connection between the battery case and the current collector plate.

The present invention relates to a method for producing a battery including the steps of:

(i) forming a first electrode material mixture layer one a first electrode core member to obtain a first electrode having an exposed portion of the first electrode core member on one end portion thereof;

(ii) forming a second electrode material mixture layer on a second electrode core member to obtain a second electrode;

(iii) winding or laminating the first electrode and the second electrode with a separator interposed therebetween to constitute an electrode group at one end surface of which the exposed portion of the first electrode core member is protruding from an end portion of the second electrode and an end portion of the separator;

(iv) preparing a first current collector plate including an intended connection portion on one surface thereof;

(v) disposing an insulating mask having an opening that overlaps the intended connection portion on the other surface of the first current collector plate; and (vi) welding the exposed portion of the first electrode core member to the above intended connection portion of the first current collector plate by applying an arc from the above other surface of the first current collector plate. The insulating mask is removed from the above other surface of the first current collector plate after the step (vi).

The present invention also relates to a method for producing a battery including the steps of:

(i) forming a first electrode material mixture layer on a first electrode core member to obtain a first electrode having an exposed portion of the first electrode core member on one end portion thereof;

(ii) forming a second electrode material mixture layer on a second electrode core member to obtain a second electrode having an exposed portion of the second electrode core member on an end portion thereof;

(iii) winding or laminating the first electrode and the second electrode with a separator interposed therebetween to constitute an electrode group at one end surface of which the exposed portion of the first electrode core member is protruding from an end portion of the second electrode and an end portion of the separator, and at the other end surface of which the exposed portion of the second electrode core member is protruding from an end portion of the first electrode and an end portion of the separator;

(iv) preparing a first current collector plate including an intended connection portion (first intended connection portion) on one surface thereof and a second current collector plate including an intended connection portion (second intended connection portion) on one surface thereof, (v) disposing an insulating mask having an opening that overlaps the first intended connection portion on the other surface of the first current collector plate, (vi) welding the exposed portion of the first electrode core member to the first intended connection portion of the first current collector plate by applying an arc from the above other surface of the first current collector plate, (vii) disposing an insulating mask having an opening that overlaps the second intended connection portion on the other surface of the second current collector plate, and (viii) welding the exposed portion of the second electrode core member to the second intended connection portion of the second current collector plate by applying an arc from the above other surface of the second current collector plate. After the steps (vi) and (viii), the insulating mask is removed from the above other surface of the first current collector plate or the second collector plate.

The thickness of the insulating layer is preferably 5 µm or more.

The insulating layer may contain ceramic particles.

It is preferable that the first current collector plate and the second current collector plate have concaves and convexes in a corrugated form in the thickness direction. In this case, it is preferable that the connection portions of the first current collector plate and the second current collector plate are provided on a concave face of the concaves and convexes.

ADVANTAGEOUS EFFECTS OF INVENTION

According to the present invention, it is possible to ensure welding of the current collector plate to the electrode group in an intended connection portion. That is, it is possible to ensure connection of the exposed portion of the first electrode core member to the connection portion of the first current collector plate, thereby to obtain a battery having a high reliability.

DESCRIPTION OF EMBODIMENTS

Embodiments of the present invention will be described with reference to drawings; however, the present invention is not limited to the following embodiments.

[First Embodiment]

Figure 1A:
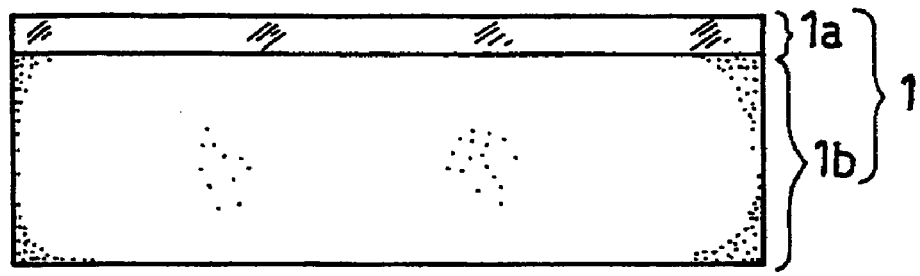
FIG. 1A is a view showing a configuration of a first electrode.
Figure 1B:
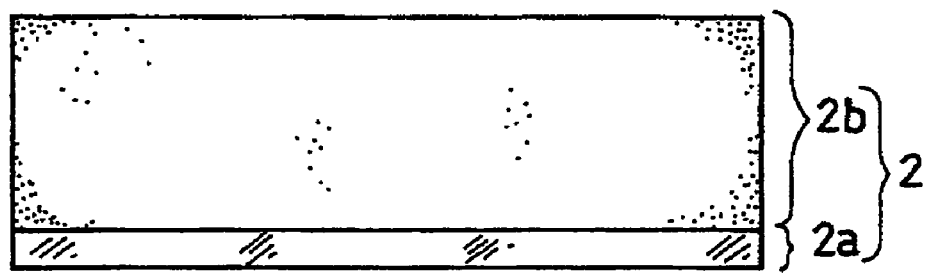
FIG. 1B is a view showing a configuration of a second electrode.
Figure 1C:
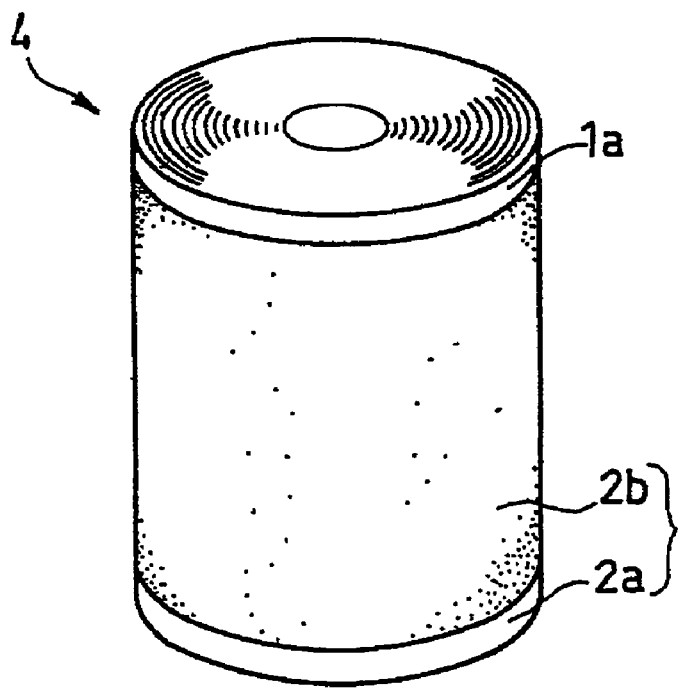
FIG. 1C is a perspective view showing an example of a wound-type electrode group.
Figure 2:
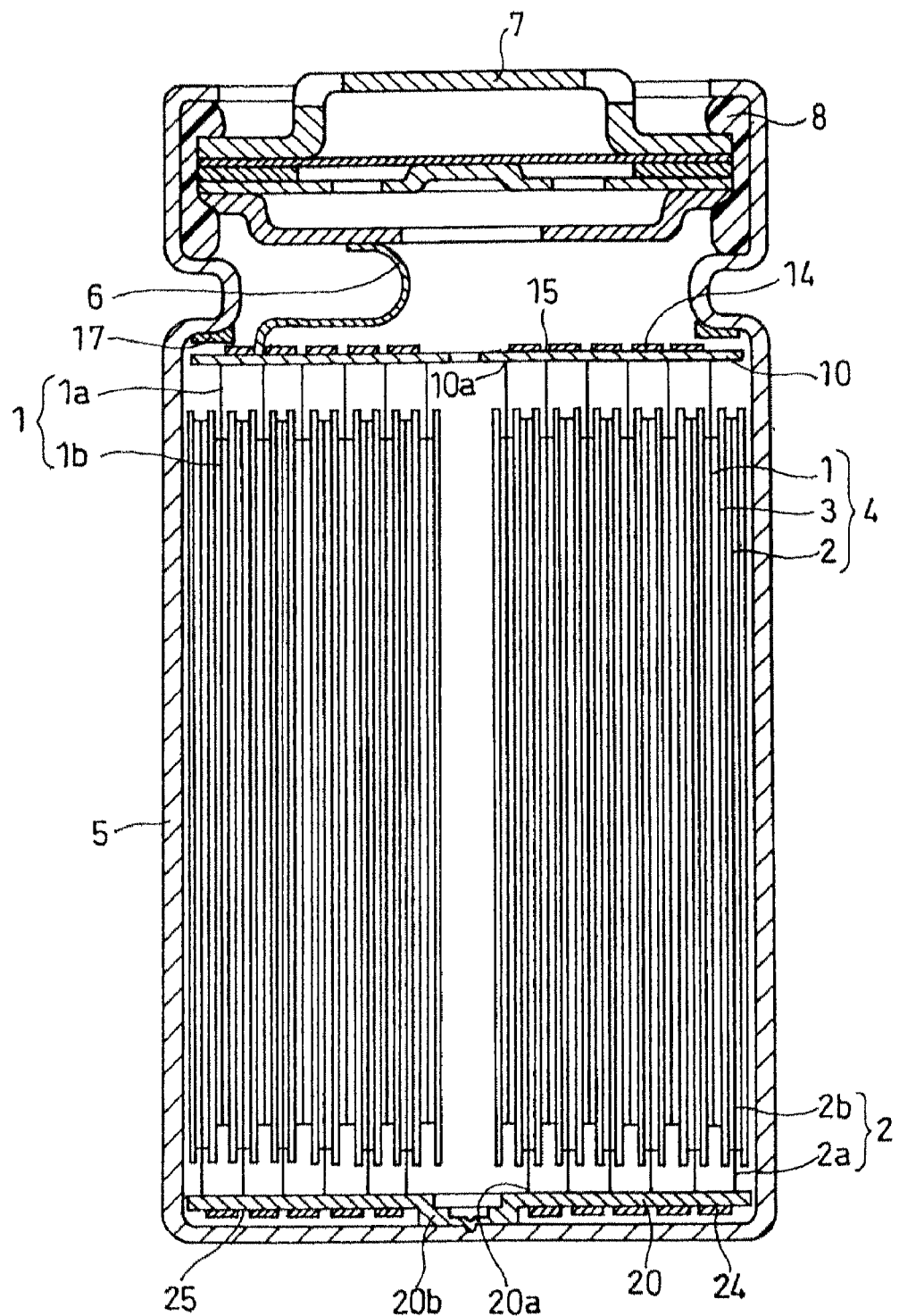
FIG. 2 is a vertical sectional view of a battery in accordance with an embodiment of the present invention.

FIGS. 1A to 1C are schematic structural view of an electrode group in accordance with this embodiment. FIG. 2 is a schematic vertical sectional view of a battery in accordance with this embodiment.

The battery in accordance with this embodiment has a structure with no tab and includes a cylindrical electrode group 4, a first current collector plate 10 in a disk form, and a second current collector plate 20 in a disk form. A first electrode 1 and a second electrode 2 are connected respectively to the first current collector plate 10 and the second current collector plate 20 with no tab interposed.

The electrode group 4 is constituted by winding the first electrode 1 in a belt form and the second electrode 2 in a belt form with a separator 3 in a belt form interposed therebetween.

The first electrode 1 includes a first electrode core member in a sheet form and first electrode material mixture layers 1b formed on both surfaces thereof. An exposed portion 1a of the first electrode core member is formed on one end portion along the longitudinal direction of the first electrode 1. In the same manner, the second electrode 2 includes a second electrode core member and second electrode material mixture layers 2b formed on both surfaces thereof. An exposed portion 2a of the second electrode core member is formed on one end portion along the longitudinal direction of the second electrode 2.

The exposed portions of the respective electrode core members are portions to be welded to connection portions of the current collector plates. When constituting the electrode group, the first electrode and the second electrode are laminated and wound with the separator interposed therebetween with the exposed portion 1a of the first electrode core member and the exposed portion 2a of the second electrode core member disposed opposite to each other. As a consequence, the exposed portion 1a of the first electrode core member is disposed on one end surface, that is, one bottom surface of the electrode group 4 in a column form, and the exposed portion 2a of the second electrode core member is disposed on the other bottom surface thereof.

From the viewpoint of facilitating welding, the exposed portion 1a of the first electrode core member is protruded outside the end portion of the second electrode 2 and the end portion the separator 3 on one bottom surface of the electrode group 4. Similarly, the exposed portion 2a of the second electrode core member is protruded outside the end portion of the first electrode 1 and the end portion of the separator 3 on the other bottom surface of the electrode group 4.

Further, from the viewpoint of ensuring prevention of short circuiting between the first electrode and the second electrode, it is desirable that the end portion of the separator 3 is protruded outside the end portion of the second electrode 2 on the bottom surface of the electrode group on which the exposed portion 1a of the first electrode core member is disposed. Similarly, it is desirable that the end portion of the separator 3 is protruded outside the end portion of the first electrode 1 on the bottom surface of the electrode group on which the exposed portion 2a of the second electrode core member is disposed.

The exposed portion 1a of the first electrode core member is welded to a connection portion 10a on one surface of the first current collector plate 10. An insulating layer 14 is formed on the other surface of the first current collector plate 10. Similarly, the exposed portion 2a of the second electrode core member is welded to a connection portion 20a on one surface of the second current collector plate 20. An insulating layer 24 is formed on the other surface of the second current collector plate 20.

The first current collector plate 10 and the second current collector plate 20 are both metallic and have a disk form. It is preferable that the current collector plate connected to the positive electrode is made of a metal such as aluminum and that the current collector plate connected to the negative electrode is made of a metal such as copper and iron. Although the shape of the current collector plate is not particularly restricted, it is preferable that the current collector plate has a shape such that it covers entirely the end surface of the electrode group to which it is to be connected. Therefore, the shape of the current collector plate is different according to the shape of the end surface of the electrode group. The thickness of the current collector plate is not particularly restricted and is 0.5 to 2 mm, for example. One or more through holes may be formed on the current collector plate.

Figure 3:
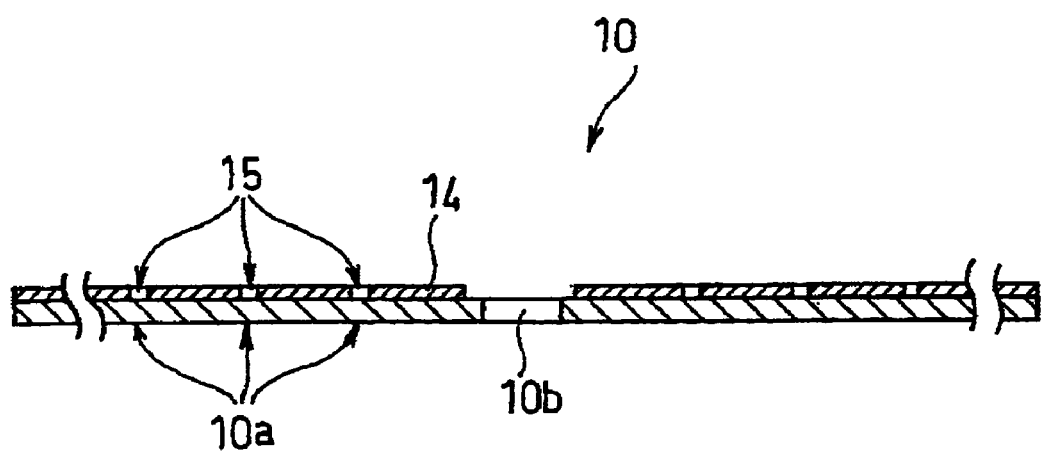
FIG. 3 is a sectional view of a current collector plate in accordance with an embodiment of the present invention.

FIG. 3 is an enlarged view of the first current collector plate 10. A through hole 10b is formed in the center of the first current collector plate. The through hole 10b has an action of accelerating discharge of gas and facilitating immersion of the electrode group with the electrolyte. For example, gas accumulated in the bottom portion of the battery passes through a hollow portion of the electrode group and flows out from the through hole of the current collector plate outside the electrode group.

One surface (surface to be connected to the electrode group 4) of the first current collector plate has the connection portion 10a connected to the exposed portion 1a of the first electrode core member 1a, and an insulating layer 14 is formed on the other surface of the first current collector plate except for a reverse face portion 15 of the connection portion 10a.

The first current collector plate is disposed on one bottom surface of the electrode group 4 such that the through hole 10b communicates with the hollow portion of the electrode group 4. It is preferable that the bottom surface of the electrode group 4 is covered completely when viewed from the first current collector plate side. Welding is performed in this state. That is, the exposed portion 1a of the first electrode core member is brought in contact with the connection portion 10a of the first current collector plate, and energy is applied by an arc discharge etc. from the side on which the insulating layer 14 is formed. At this time, the arc is not applied to the portion on which the insulating layer 14 is formed. The arc is applied intensively to the reverse face portion 15 of the connected portion 10a, that is, the metal surface of the first current collector plate on which the insulating layer is not disposed. As a consequence, it is possible to limit the connection portion 10a to an intended portion, and thereby the welding is completed efficiently.

The second current collector plate 20 has substantially the same structure as the first current collector plate 10 and includes a connection portion 20a connected to the exposed portion 2a of the second electrode core member and an insulating layer 24 formed in an area except for a reverse face portion 25 of the connection portion 20a. The second current collector plate 20 has no through hole in the center but has a central welding portion 20b serving as a connection portion connected to a bottom surface of a battery case 5. However, the structure of the second current collector plate is not particularly limited. The second current collector plate 20 may have a through hole and may not have the central welding portion 20b.

The connection portion 10a of the first current collector plate and the connection portion 20a of the second current collector plate can be set voluntarily by a formation pattern of the insulating layer.

As a method for welding the exposed portion of the electrode core member to the intended connection portion of the current collector plate, a welding method such as an arc welding, a laser welding, and an electron beam welding can be employed. However, from the viewpoint of efficiently applying energy for welding to the reverse face portion of the intended connection portion that is not covered with the insulating layer 14, it is preferable to employ an arc welding. Examples of the arc welding include TIG (tungsten inert gas) welding, MIG welding, MAG welding, and carbonic gas arc welding, and TIG welding is particularly preferable. TIG welding is particularly effective when the current collector plate is composed of copper, aluminum etc. Also, in the case of TIG welding, since only the current collector plate can be melted, it is considered that welding with high reliability can be readily performed without damaging the electrode core member. In the case of a lithium ion secondary battery, the thickness of the electrode core member ranges from about 10 to 30 µm, for example. Therefore, TIG welding is preferable from the viewpoint of inhibiting defects such as short circuiting caused by bending of the electrode core member.

The thickness of the insulating layer formed on the surface of the current collector plate is preferably more than 5 µm, and more preferably 10 to 100 µm. In the case where the thickness of the insulating layer is less than 5 µm, the arc may not possibly be applied efficiently to the metal face avoiding the insulating layer during the arc welding.

The insulating layer preferably includes ceramic particles. Ceramics are preferable as a material for the insulating layer because of having a favorable insulating property, a high melting point, and a low reactivity. Examples of the usable ceramics include oxides, carbides, nitrides, and borides. Specifically, alumina, magnesia etc. can be used without any particular restriction. Although the average particle diameter of the ceramic particles is not particularly restricted, it ranges preferably from 0.1 to 2 µm.

In the following, a method for producing the battery according to this embodiment will be described sequentially.

(i) The first electrode is prepared. The first electrode 1 as shown in FIG. 1A can be obtained by forming the first electrode material mixture layer 1b on the first electrode core member except for the exposed portion 1a.

(ii) The second electrode is prepared. The second electrode 2 as shown in FIG. 1B can be obtained by forming the second electrode material mixture layer 2*b* on the second electrode core member except for the exposed portion 2*a*. However, it is not essential to leave the exposed portion 2*a* of the second electrode core member.

The electrode core member is metallic, and in the case of the positive electrode, aluminum, nickel, magnesium etc. are used; in the case of the negative electrode, copper, iron, nickel etc. are used. Although the shape of the electrode core member is not particularly restricted, it is for example a foil or a sheet in a belt form. In this case, the exposed portion of the first electrode core member is formed on an end portion along the longitudinal direction of the electrode in the belt form. The foil or the sheet may be composed of a porous material.

(iii) An electrode group in which the exposed portion of the first electrode core member is protruding from the end portion of the second electrode and the end portion of the separator on one end surface is constituted by winding or laminating the first electrode and the second electrode with the separator interposed therebetween. The electrode group 4 as shown in FIG. 1C is formed by disposing the first electrode 1, the second electrode 2, and the separator 3 such that the exposed portion 1*a* of the first electrode core member and the exposed portion 2*a* of the second electrode core member are placed opposite to each other and that they are protruding from the end portion of the separator 3, and winding these in a spiral form.

Herein, the separator 3 may be a microporous film made of a resin, a porous insulating film including a filler such as a metal oxide and a binder, or a laminate of a microporous film made of a resin and the porous insulating film.

(iv) A current collector plate having an intended connection portion on one surface and an insulation layer formed on the other surface except for the portion overlapping the intended connection portion is prepared, and (v) an arc is applied from the other surface of the current collector plate thereby to weld the exposed portion of the electrode core member to the intended connection portion of the current collector plate. In the case of using the electrode group 4 as shown in FIG. 1C, the first current collector plate 10 and the second current collector plate 20 as shown in FIGS. 2 and 3 are prepared. On reverse faces of the surfaces of the first current collector plate 10 and the second current collector plate 20 that are connected to the electrode group 4, insulating layers 14 and 24 are formed, partially leaving metal surfaces 15 and 25.

Examples of a method for forming the insulating layers 14 and 24 include application, spray, sputtering etc. of an insulating material. For example, an insulating paste is prepared by mixing ceramic particles, a binder, and a liquid component, and the insulating paste is applied onto a prescribed surface of the current collector plate and dried. However, the method is not limited thereto as long as it enables uniform formation of an insulating layer.

Next, the first current collector plate 10 is disposed on one end surface of the electrode group 4 with the insulating layer 14 placed outside. Subsequently, the first current collector plate 10 and the exposed portion 1*a* of the first electrode core member are welded together by an arc welding. Specifically, an electrode for welding is disposed away from the reverse face portion 15 of the connection portion 10*a* of the first current collector plate, and an arc is applied to melt the connection portion 10*a* of the first current collector plate. By using an arc welding such as TIG welding, the arc is surely applied to the metal surface on which the insulating layer 14 is not formed, which can melt the connection portion 10*a*. Thereby, the first current collector plate 10 and the electrode group 4 can be connected to each other.

Thereafter, the second current collector 20 is disposed on the other end surface of the electrode group 4 with the insulating layer 24 placed outside. Then, by the same operation as in the case of the first current collector plate, the second current collector plate 20 and the electrode group 4 are connected to each other.

Subsequently, the electrode group 4 to which both of the current collector plates are welded are housed in the battery case 5. Herein, the second current collector plate 20 is brought in contact with the bottom surface of the battery case 5. The first current collector plate 10 is connected to a sealing plate 7 via a lead 6. Then, a non-aqueous electrolyte is poured into the battery case 5, and the battery is sealed by caulking an opening end of the battery case on a gasket 8 provided in the periphery of the sealing plate 7. The battery case 5 has an inwardly recessed portion, and an insulating member 17 for ensuring insulation with the first current collector plate 10 is disposed in the recessed portion.

As described above, the insulating layer is formed on the first current collector plate 10 and the second current collector plate 20 except for the reverse face portion of the connection portion connected to the electrode group. Therefore, when welding the current collector plate to the electrode group, the arc is applied only to the metal surface on which the insulating layer is not formed. In this case, the arc is surely applied to the metal surface of the current collector plate. Consequently, the current collector plate and the electrode plate can be connected in a desired connection portion as long as a relative positional relation of the electrode group with the current collector plate is fixed even if arrangement location of the electrode for welding is somewhat displaced. As a consequence, connection defects of the electrode group with the current collector plate can be greatly reduced, thereby preventing a decrease in the yield.

[Second Embodiment]

Figure 4:
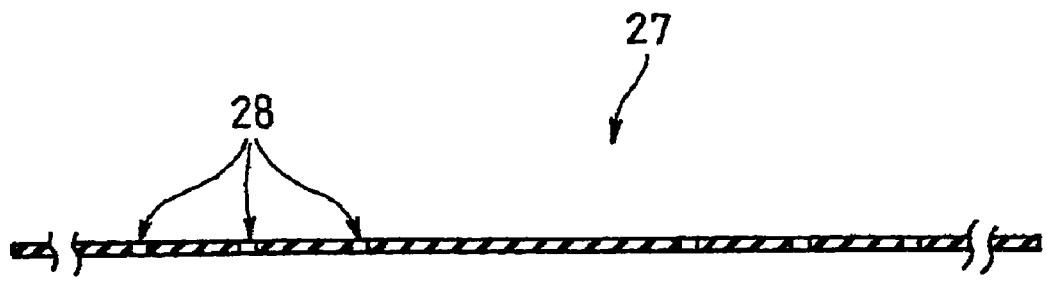
FIG. 4 is a sectional view of an insulating mask in accordance with an embodiment of the present invention.
Figure 5:
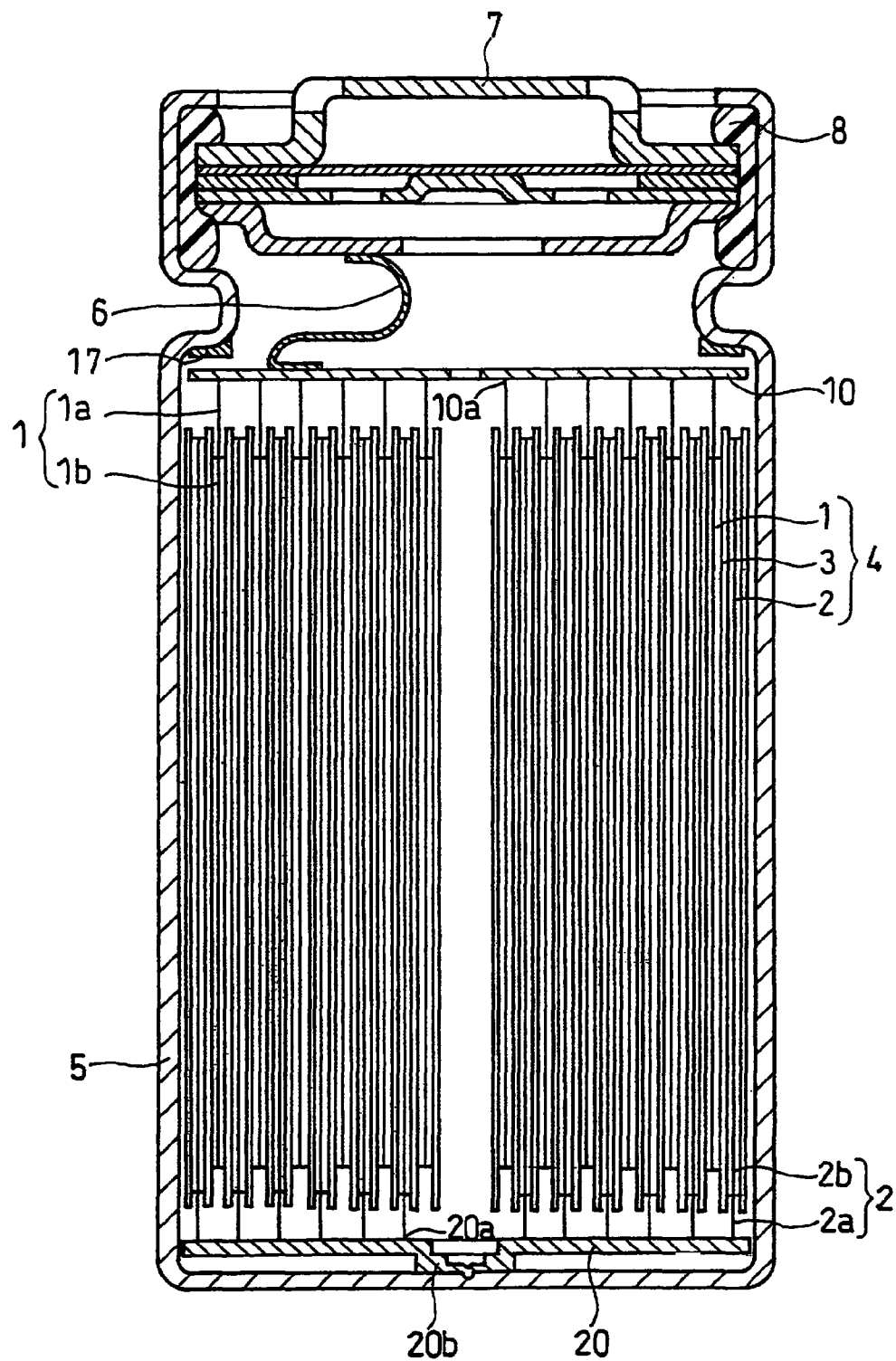
FIG. 5 is a vertical sectional view of a battery in accordance with another embodiment of the present invention.

FIG. 4 is a sectional view of an insulating mask used in a method for producing a battery in accordance with this embodiment. FIG. 5 is a vertical sectional view of a battery produced in accordance with the production method of this embodiment.

In this embodiment, at least one of the first current collector plate and the second current collector plate has a structure different from that of the first embodiment, and the method for welding the current collector plate to the electrode group is also different. The battery as shown in FIG. 5 has the same structure as that of the first embodiment except that no insulating layer is formed on the first current collector plate 10 and the second current collector plate 20.

In this embodiment, when welding the first current collector plate 10 to the electrode group 4, and welding the second current collector plate 20 to the electrode group 4, an insulating mask 27 is disposed onto a reverse face of the connection portion of the current collector plate with the electrode group 4. The insulating mask 27 has one or more opening 28 on the location corresponding to the intended connection portion of the current collector plate.

The exposed portion of the electrode core member is welded to the intended connection portion of the current collector plate by attaching one surface of each current collector plate to an end surface of the electrode group and applying an arc from the other surface via the insulating mask. At this time, the arc can be applied intensively into the opening 28 of the insulating mask by using an arc welding such as TIG welding. In consequence, the current collector plate and the electrode group can be connected at a desired connection portion. As a result, connection defects of the electrode group with the current collector plate can be greatly reduced, thereby to prevent a decrease in the yield. After termination of welding, the insulating mask 27 is removed from the other surface of the current collector plate.

[Third Embodiment]

Figure 6:
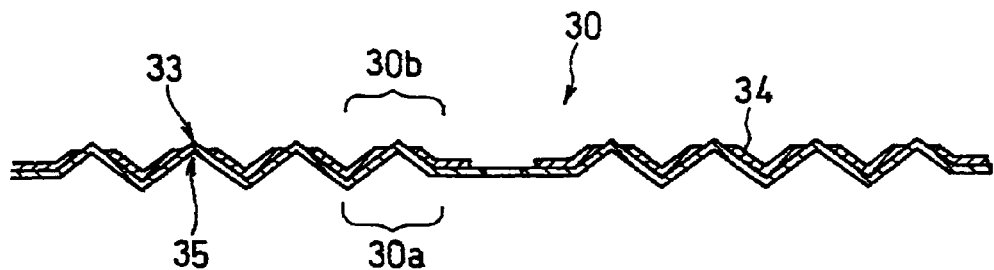
FIG. 6 is a sectional view of a current collector in accordance with another embodiment of the present invention.

A current collector plate in accordance with this embodiment has a structure different from that of the first embodiment and the second embodiment. FIG. 6 is a sectional view of an example of the current collector plate in accordance with this embodiment. A current collector plate 30 has concaves and convexes in a corrugated form in the thickness direction. In the case where the electrode group is cylindrical and the current collector plate is in a disk form, it is preferable that concaves and convexes are formed concentrically when viewed from one surface or the other surface of the current collector plate. However, the configuration of the concaves and convexes viewed from one surface or the other surface of the current collector plate is not particularly limited as long as the configuration thereof is in accordance with the configuration of the exposed portion of the electrode core member protruding from the end surface of the electrode group. Also, the shape of the wave in the cross section is not particularly limited, and for example a tip of a convex portion and a bottom of a concave portion may be pointed acutely, or may be curved.

An insulating layer 34 is formed on one surface of the current collector plate 30 except for the vicinity of a tip 33 of a convex face 30b. The exposed portion of the electrode core member protruding from the end surface of the electrode group is accommodated in a concave 30a on the other surface of the current collector plate, and the exposed portion of the electrode core member and the concave of the current collector plate are engaged with each other. In consequence, not only positioning of the exposed portion of the electrode core member with the connection portion of the current collector plate is facilitated, but also welding strength is increased thereby to improve current collection efficiency. An arc welding using such a current collector plate ensures welding at a desired connection portion 35 because an arc flies intensively onto the vicinity of the tip 33 of the convex face 30b.

[Fourth Embodiment]

Figure 7:
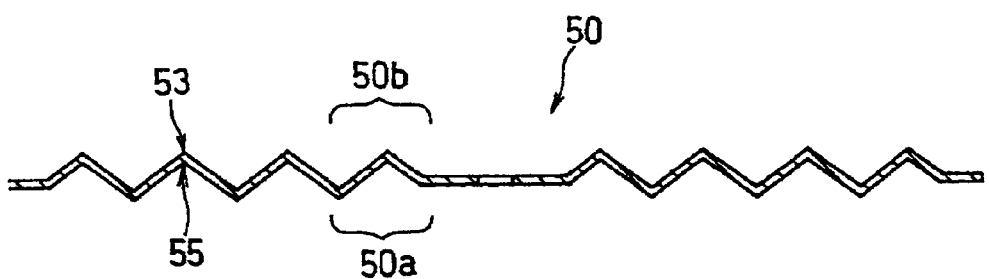
FIG. 7 is a sectional view of a current collector plate in accordance with still another embodiment of the present invention.

A current collector plate in accordance with this embodiment has the same structure as that of the third embodiment except for not including an insulating layer. FIG. 7 is a sectional view of an example of the current collector plate in accordance with this embodiment. A current collector plate 50 has concaves and convexes in a corrugated form in the thickness direction. The exposed portion of the electrode core member protruding from the end surface of the electrode group is accommodated in a concave 50a on the other surface of the current collector plate, and the exposed portion of the electrode core member and the concave of the current collector plate are engaged with each other.

At the time of welding, an arc is applied to the current collector plate via an insulating mask having an opening corresponding to the vicinity of a tip 53 on the convex, that is, a connection portion 55. The arc is not applied to the insulating mask and applied intensively to the vicinity of the tip 53 of the convex that is exposed at the opening. Therefore, it is possible to ensure welding at the intended connection portion 55.

EXAMPLES

In the following, the present invention will be described with reference to examples applied to a cylindrical lithium ion secondary battery.

Example 1

(1) Production of Positive Electrode

A positive electrode material mixture paste was prepared by mixing 85 parts by weight of a powder of lithium cobaltate as a positive electrode active material, 10 parts by weight of a carbon powder as a conductive agent, 5 parts by weight of polyvinylidene fluoride (PVDF) as a binder, and an appropriate amount of N-methyl-2-pyrrolidone (NMP).

The positive electrode material mixture paste was applied onto both surfaces of a positive electrode core member made of an aluminum foil having a thickness of 15 μm and a width of 56 mm. Herein, an exposed portion of the positive electrode core member having a width of 6 mm was left on one end portion along the longitudinal direction of the positive electrode core member, and the width of an applied film of the positive electrode material mixture paste was 50 mm. Thereafter, the applied films were dried and rolled, thereby to obtain a positive electrode having a thickness of 150 μm.

(2) Production of Negative Electrode

A negative electrode material mixture paste was prepared by mixing 95 parts by weight of an artificial graphite powder, 5 parts by weight of PVDF as a binder, and an appropriate amount of NMP.

The negative electrode material mixture paste was applied onto both surfaces of a negative electrode core member made of a copper foil having a thickness of 10 μm and a width of 57 mm. Herein, an exposed portion of the negative electrode core member having a width of 5 mm was left on one end portion along the longitudinal direction of the negative electrode core member, and the width of an applied film of the positive electrode material mixture paste was 52 mm. Thereafter, the applied films were dried and rolled, thereby to obtain a negative electrode having a thickness of 160 μm.

(3) Production of Electrode Group

An electrode group is produced by interposing a microporous film made of polypropylene resin having a width of 53 mm and a thickness of 25 μm as a separator between the positive electrode and the negative electrode and winding these in a spiral form. Herein, as shown in FIG. 1C, the exposed portion of the positive electrode core member and the exposed portion of the negative electrode core member were disposed opposite to each other, and the exposed portion of the positive electrode core member was made to protrude from one bottom surface and an end face of the negative electrode core member was made to protrude from the other bottom surface.

From the viewpoint of preventing short circuiting between the positive electrode and the negative electrode, an end portion of the separator was made to protrude outside an end portion of the negative electrode on the bottom surface of the electrode group where the exposed portion of the positive electrode core member was disposed. Also, the end portion of the separator 3 was made to protrude outside an end portion of the positive electrode on the bottom surface of the electrode group where the exposed portion of the negative electrode core member is disposed.

(4) Production of Current Collector Plate

A positive electrode current collector plate in a disk form having a diameter of 24 mm was cut out from an aluminum plate having a thickness of 0.8 mm by a presswork. A though hole having a diameter of 7 mm was formed in the center of the positive electrode current collector.

In the same manner, a negative electrode current collector plate in a disk form having a diameter of 24 mm was cut out from a copper plate having a thickness of 0.6 mm by a presswork. Herein, no through hole was formed on the negative electrode current collector plate.

Figure 8:
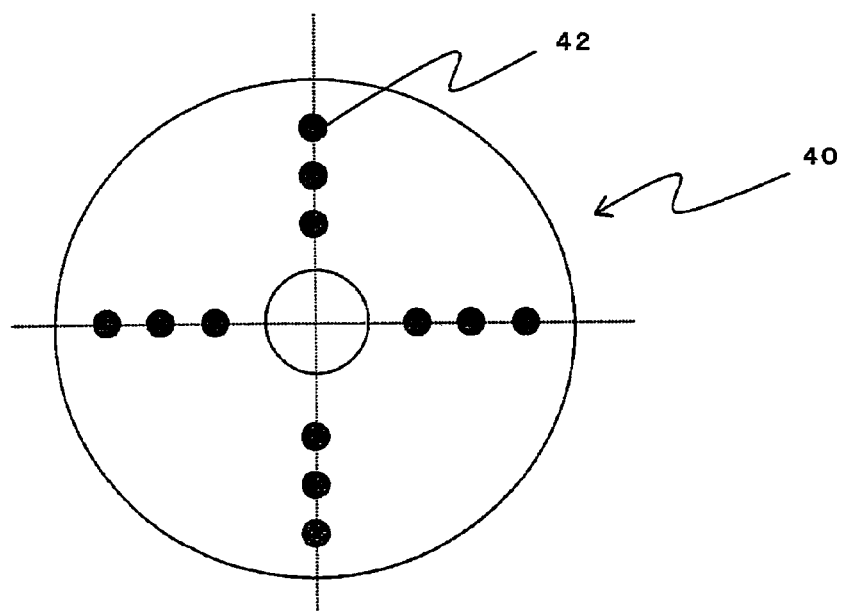
FIG. 8 is a view showing a pattern of an intended connection portion disposed on the current collector plate.

An intended connection portion having a diameter of 2 mmφ was supposed on one surface of each of the positive electrode current collector plate and the negative electrode current collector plate, and an insulating layer was formed on a prescribed area on the other surface. As shown in FIG. 8, three intended connection portions 42 were formed in the diameter direction of a current collector plate 40 in a cross form. Herein, on the positive electrode current collector plate, an insulating layer was formed in an area except for a reverse face portion of the intended connection portion and a portion to be welded to a lead. Also, on the negative electrode current collector plate, an insulating layer was formed in an area except for a reverse face portion of the intended connection portion and a portion to be welded to a bottom portion of a battery case.

The insulating layer was formed by using an insulating paste. First, the insulating paste was prepared by mixing 48 parts by weight of alumina having an average particle diameter of 0.5 μm as ceramic particles, 4 parts by weight of a binder composed of polyacrylonitrile modified rubber, and about 40 parts by weight of NMP. The obtained insulating paste was applied onto a prescribed surface of the current collector plate in a thickness of 80 μm and subsequently the applied film was dried thereby obtaining an insulating layer.

(5) Welding of Current Collector Plate

The positive electrode current collector plate was attached to the end surface of the electrode group where the exposed portion of the positive electrode core member was protruding, and the exposed portion of the positive electrode core member was welded to the intended connection portion of the positive electrode current collector plate by TIG welding. The conditions of TIG welding were a current value of 100 A and a welding time of 100 ms.

Similarly, the negative electrode current collector plate was attached to the end surface of the electrode group where the exposed portion of the negative electrode core member was protruding, and the exposed portion of the negative electrode core member was welded to the intended connection portion of the negative electrode current collector plate by TIG welding. The conditions of TIG welding were a current value of 130 A and a welding time of 50 ms.

(6) Production of Battery

A battery as shown in FIG. 2 was produced in the following manner.

The electrode group having a current collecting structure described above was introduced into a cylindrical battery case with a bottom having an opening on top. At this time, the negative electrode current collector plate was disposed on the bottom portion side of the battery case. Thereafter, the negative electrode current collector plate was resistance welded to the bottom portion of the battery case. Also, the positive electrode current collector plate was connected to a sealing plate via a positive electrode lead made of aluminum. An insulating member for preventing short circuiting was disposed between the positive electrode current collector plate and the sealing plate.

A non-aqueous electrolyte was prepared by dissolving lithium hexafluorophosphate ($LiPF_6$) at a concentration of 1 mol/L in a mixed solvent of ethylene carbonate and ethylmethyl carbonate in a volume ratio of 1:1. After the battery case was heated and dried, the non-aqueous electrolyte was poured into the battery case, and the electrode group was impregnated sufficiently with the non-aqueous electrolyte.

Thereafter, an opening end of the battery case was caulked on the sealing plate via a gasket thereby to seal the opening of the battery case. In this manner, a cylindrical lithium ion secondary battery (sample 1) having a diameter of 26 mm and a height of 65 mm was completed. Sample 1 had a battery capacity of 2600 mAh.

Example 2

A cylindrical lithium ion secondary battery (sample 2) similar to that of Example 1 except for the following points was produced.

The step of forming an insulating layer on each of the positive electrode current collector plate and the negative electrode current collector plate was omitted. Herein, at the time of TIG welding, one surface having an intended connection portion was attached to an end surface of the electrode group and an insulating mask having a thickness of 1 mm composed of silicon nitride was disposed on the other surface.

The insulating mask covered completely the other surface of the current collector plate except for a reverse face portion of the intended connection portion having a diameter of 2 mmφ. The insulating mask was removed from the current collector plate after welding.

Example 3

A cylindrical lithium ion secondary battery (sample 3) similar to that of the Example 1 except that the structure of the current collector plate was changed was produced. The current collector plate was produced in the following manner.

When cutting out the positive electrode current collector plate from an aluminum plate having a thickness of 0.8 mm, concaves and convexes in a corrugated form having a cross section of a letter V were formed by changing a press mold. The height (amplitude) of the concaves and convexes was 10 mm and the angle at a tip of a convex and at a bottom of a concave was 120°. The configuration of the concaves and convexes was concentrical when viewed from one surface of the current collector plate, and the gap between neighboring concaves or convexes in the diameter direction of the disk was 2 mm.

Similarly, when cutting out the negative electrode current collector plate from a copper plate having a thickness of 0.6 mm, concaves and convexes in a corrugated form similar to those of the positive electrode current collector plate were formed by changing the press mold.

The area in which the insulating layer is formed on both of the current collector plates was the same as Example 1.

Example 4

A cylindrical lithium ion secondary battery (sample 4) was produced by using a positive electrode current collector plate and a negative electrode current collector plate similar to those of Example 3 except for not forming the insulating layer, and using an insulating mask in the same manner as in Example 2.

Comparative Example 1

A cylindrical lithium ion secondary battery (sample 5) was produced in the same manner as in Example 2 except for not using an insulating mask.

A cylindrical lithium ion secondary battery (sample 6) was produced in the same manner as in Example 4 except for not using an insulating mask.

[Evaluations]

Fifty each of the lithium ion secondary batteries of samples 1 to 6 were prepared, and the following evaluations were made.

(Observation of Appearance of Connection Portion of End Surface of Electrode Group with Current Collector Plate)

The connection portion was observed visually immediately after welding the current collector plate. The results are shown in the column of "state in connection portion" in FIG. 1.

In samples 1 to 4, defects of non-connection (state where melted metal from the current collector plate did not reach the end surface of the electrode group) and breakage of the electrode core member were not observed. In contrast, in samples 5 and 6, defects of non-connection were observed in all the batteries.

(Measurement of Tensile Strength)

Five each of the batteries of samples 1 to 6 were taken out and tensile strength at the connection portion was measured on the basis of JIS 22241. Specifically, in the state where the electrode group was fixed by one jig of a tensile test machine and the current collector plate was fixed by the other jig of the tensile test machine, these were allowed to be stretched in the axis direction of the tensile test machine (direction in which the electrode group and the current collector move away from each other), and the load when the connection portion was broken was determined as the tensile strength. The measurement results are shown in the column of "tensile strength" in Table 1.

In samples 1 to 4, all the batteries had a high tensile strength of 50 N or 55 N or more. On the other hand, in sample 5, one per five batteries had a tensile strength of 20 N or less. Also, in sample 6, one per five batteries had a tensile strength of 30 N or less.

(Measurement of Internal Resistance of Batteries)

Internal resistance of the batteries of samples 1 to 6 was measured. Specifically, a charge/discharge cycle of charging at a constant current of 1250 mA up to 4.2 V and discharging at a constant current of 1250 mA up to 3.0 V was repeated for three times with each battery. Thereafter, internal resistance of the batteries was measured by applying an alternating current of 1 kHz and connection state was evaluated. The results are shown in the column of "internal resistance" in Table 1.

In samples 1 and 2, the average value of internal resistance was 5 mΩ, and in samples 3 and 4, the average value of internal resistance was 4 mΩ; variation thereof was about 5% in any of these samples. On the other hand, in sample 5, the average value of internal resistance was 10 mΩ and variation thereof was more than 30%. Also, in sample 6, the average value of internal resistance was 5 mΩ, and variation thereof was more than 10%.

(Measurement of Output Current)

Average output current (I) was calculated from the measured value (R) of internal resistance in the batteries of samples 1 to 6. In the case the batteries were charge to 4.2 V and subsequently discharged to 3 V, R (resistance)×I (current)=Δ1.2 (voltage). Therefore, I (current)=Δ1.2 (voltage)/R (resistance). The results are shown in Table 1.

As shown in Table 1, the batteries to which the present invention is applied enable discharging at a large current, and batteries with high performance can be produced stably.

[Industrial Applicability]

The present invention can be applied to a sealed type storage battery such as a lithium ion secondary battery and nickel-hydride secondary battery. The present invention can be applied not only to a battery having a wound type electrode group but also a flat or laminate type electrode group. Further, the present invention is also applicable to an electrochemical device (e.g. dry battery, condenser) having a current collecting structure similar to that of the secondary batteries.

The present invention is particularly advantageous in a sealed type secondary battery having a current collecting structure appropriate for discharging at a large current, and it is applicable to a power source for driving electric tools and electric vehicles requiring a high output, a power source for backup with a large capacity, a power source for storage of electricity and the like.

[REFERENCE SIGNS LIST]

1 First electrode
1a Exposed portion of first electrode core member
1b First electrode material mixture layer
2 Second electrode
2a Exposed portion of second electrode core member
2b Second electrode material mixture layer
3 Separator
4 Electrode group
5 Battery case
6 Lead
7 Sealing plate
8 Gasket
10 First current collector plate
10a, 20a, 35, 55 Connection portion
10b Through hole
14, 24, 34 Insulating layer
15, 25 Reverse face portion (Metal surface)
17 Insulating member
20 Second current collector plate
20b Central welding portion
27 Insulating mask
28 Opening
30, 50 Current collector plate
30a, 50a Concave
30b, 50b Convex
33, 53 Tip of convex portion
40 Current collector plate
42 Intended connection portion

TABLE 1

| | Current collector plate | State of connection portion | Tensile strength | Internal resistance (variation) | Output current |
|---|---|---|---|---|---|
| Sample 1 | Insulating layer formed | Normal | ≧50 N | 5 mΩ (5%) | 240 A |
| Sample 2 | Use of insulating mask | | ≧50 N | 5 mΩ (5%) | 240 A |
| Sample 3 | Insulating layer formed | | ≧55 N | 4 mΩ (5%) | 300 A |
| Sample 4 | Use of insulating mask | | ≧55 N | 4 mΩ (5%) | 300 A |
| Sample 5 | — | Non-connected portion present | ≦20 N (probability of 1/5) | 10 mΩ (30%) | 120 A |
| Sample 6 | — | | ≦30 N (probability of 1/5) | 5 mΩ (10%) | 240 A |

The invention claimed is:

1. A battery comprising:
    an electrode group comprising a first electrode, a second electrode, and a separator interposed therebetween that are wound or laminated; and
    a first current collector plate electrically connected to the first electrode, wherein:
    the first electrode includes a first electrode core member and a first electrode material mixture layer formed on the first electrode core member,
    the second electrode includes a second electrode core member and a second electrode material mixture layer formed on the second electrode core member,
    one end portion of the first electrode is protruding from an end portion of the second electrode and an end portion of the separator at one end surface of said electrode group, and the protruding end portion of the first electrode has an exposed portion of the first electrode core member,
    said exposed portion of the first electrode core member is welded to a connection portion on one surface of the first current collector plate, and
    an insulating layer is formed in an area except for a reverse face portion of said connection portion on another surface opposed to said one surface of the first current collector plate, and is not in direct contact with a battery case.

2. The battery in accordance with claim 1,
    wherein said exposed portion of the first electrode core member and said connection portion of the first current collector plate form an arc welded connection.

3. The battery in accordance with claim 1,
    wherein said insulating layer has a thickness of 5 μm or more.

4. The battery in accordance with claim 1,
    wherein said insulating layer includes ceramic particles.

5. The battery in accordance with claim 1, wherein said first current collector plate has concaves and convexes in a corrugated form in the thickness direction thereof, and said connection portion is located on a concave face in said concaves and convexes.

6. A method for producing a battery including steps of:
    (i) forming a first electrode material mixture layer on a first electrode core member to obtain a first electrode having an exposed portion of said first electrode core member on one end portion thereof;
    (ii) forming a second electrode material mixture layer on a second electrode core member to obtain a second electrode;
    (iii) winding or laminating the first electrode and the second electrode with a separator interposed therebetween thereby to constitute an electrode group at one end surface of which said exposed portion of the first electrode core member is protruding from an end portion of the second electrode and an end portion of the separator;
    (iv) preparing a first current collector plate including an intended connection portion on one surface thereof and an insulating layer formed in an area on another surface opposed to said one surface thereof except for a reverse face portion of said intended connection portion; and
    (v) welding said exposed portion of the first electrode core member to said intended connection portion of the first current collector plate by applying an arc from said other surface of the first current collector plate,
    wherein the insulating layer is not in direct contact with a battery case when the electrode group is assembled into the battery case after the step (v).

7. The method for producing a battery in accordance with claim 6,
    wherein said first current collector plate has concaves and convexes in a corrugated form in the thickness direction thereof, and said intended connection portion is located on a concave face of said concaves and convexes.

8. A method for producing a battery including steps of:
    (i) forming a first electrode material mixture layer on a first electrode core member to obtain a first electrode having an exposed portion of said first electrode core member on one end portion thereof;
    (ii) forming a second electrode material mixture layer on a second electrode core member to obtain a second electrode;
    (iii) winding or laminating the first electrode and the second electrode with a separator interposed therebetween thereby to constitute an electrode group at one end surface of which said exposed portion of the first electrode core member is protruding from an end portion of the second electrode and an end portion of said separator;
    (iv) preparing a first current collector plate including an intended connection portion on one surface thereof;
    (v) disposing an insulating mask having an opening that overlaps said intended connection portion on another surface opposed to said one surface of the first current collector plate; and
    (vi) welding said exposed portion of the first electrode core member to said intended connection portion of the first current collector plate by applying an arc from said other surface of the first current collector plate.

9. The method for producing a battery in accordance with claim 8, further including a step of removing said insulating mask from said other surface of the first current collector plate after the step (vi).

10. The method for producing a battery in accordance with claim 8,
    wherein said first current collector plate has concaves and convexes in a corrugated form in the thickness direction thereof, and said intended connection portion is located on a concave face of said concaves and convexes.

11. The method for producing a battery in accordance with claim 8, wherein the insulating mask is disposed so as not to be in direct contact with a battery case when the electrode group is assembled into the battery case after the step (vi).

* * * * *